United States Patent
Sasaki et al.

(10) Patent No.: US 12,499,647 B2
(45) Date of Patent: Dec. 16, 2025

(54) DETECTION-FRAME POSITION-ACCURACY IMPROVING SYSTEM AND DETECTION-FRAME POSITION CORRECTION METHOD

(71) Applicant: HITACHI ASTEMO, LTD., Hitachinaka (JP)

(72) Inventors: Goshi Sasaki, Tokyo (JP); So Sasatani, Tokyo (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 299 days.

(21) Appl. No.: 18/547,762

(22) PCT Filed: Feb. 25, 2022

(86) PCT No.: PCT/JP2022/007983
§ 371 (c)(1),
(2) Date: Aug. 24, 2023

(87) PCT Pub. No.: WO2022/264533
PCT Pub. Date: Dec. 22, 2022

(65) Prior Publication Data
US 2024/0127567 A1 Apr. 18, 2024

(30) Foreign Application Priority Data
Jun. 15, 2021 (JP) .................. 2021-099602

(51) Int. Cl.
*G06V 10/22* (2022.01)
*G06T 7/246* (2017.01)
(Continued)

(52) U.S. Cl.
CPC .............. *G06V 10/22* (2022.01); *G06T 7/246* (2017.01); *G06T 7/73* (2017.01); *G06V 20/58* (2022.01);
(Continued)

(58) Field of Classification Search
None
See application file for complete search history.

(56) References Cited

U.S. PATENT DOCUMENTS

| 2018/0336701 A1 | 11/2018 | Yokota et al. |
| 2019/0050994 A1* | 2/2019 | Fukagai .................. G06F 18/24 |

(Continued)

FOREIGN PATENT DOCUMENTS

| JP | 2017-151535 A | 8/2017 |
| JP | 2019-036009 A | 3/2019 |
| JP | 6614247 B2 | 12/2019 |

OTHER PUBLICATIONS

International Search Report with English Translation and Written Opinion of International Patent Application No. PCT/JP2022/007983 dated May 17, 2022 (8 pages).

*Primary Examiner* — Delomia L Gilliard
(74) *Attorney, Agent, or Firm* — Foley & Lardner LLP (57) ABSTRACT

Provided are a detection frame position accuracy improvement system and a detection frame position correction method capable of estimating a detection frame position with high accuracy using information before and after a target frame. The detection frame position accuracy improvement system includes a time-series image input unit 10 that inputs time-series images, an object detection unit 20 that detects a target object with the time-series images, a detection frame position distribution estimation unit 30 that estimates a distribution of detection frame position coordinates at time t from detection results of the target object up to time t−1 (t is a positive integer), a detection frame prediction unit 40 that predicts positions of a detection frame at times t+1 to t+n (n is a positive integer) according to the detection results and the distribution, a detection frame uncertainty estimation unit 50 that updates the distribution of the detection frame position coordinates at time t accord- (Continued)

ing to degrees of overlap between the detection results of the target object at the times t+1 to t+n and the predicted detection frame and estimates uncertainty of a detection frame at time t, and a detection frame correction unit 60 that corrects the detection frame at time t on the basis of the detection frame and the uncertainty.

11 Claims, 11 Drawing Sheets

(51) Int. Cl.
  *G06T 7/73* (2017.01)
  *G06V 20/58* (2022.01)
(52) U.S. Cl.
  CPC ............... *G06T 2207/10016* (2013.01); *G06T 2207/30252* (2013.01)

(56) References Cited

U.S. PATENT DOCUMENTS

| | | | |
|---|---|---|---|
| 2019/0139232 A1* | 5/2019 | Jia | G06V 10/751 |
| 2019/0266420 A1* | 8/2019 | Ge | G06T 7/248 |
| 2021/0049776 A1* | 2/2021 | Tan | G06F 18/24323 |

* cited by examiner

DETECTION-FRAME POSITION-ACCURACY IMPROVING SYSTEM AND DETECTION-FRAME POSITION CORRECTION METHOD

TECHNICAL FIELD

The present invention relates to a detection frame position accuracy improvement system and a detection frame position correction method.

BACKGROUND ART

With the spread of in-vehicle cameras and the like, the variety of vehicle data that can be acquired is increasing. As a result, at the time of occurrence of an accident or the like, there is an increasing need for objective situation evaluation and cause analysis using information of a recording terminal device that records acquired vehicle data. In situation evaluation and cause analysis using images (camera images) of an in-vehicle camera, positional accuracy of a detection frame (the size of a target object such as a preceding vehicle in a camera image) is important.

There is a technique described in Japanese Patent No. 6614247 (PTL 1) for improving detection frame position accuracy. This publication describes "a prediction means that identifies a predictive region by predicting a position of an object in a current frame from a position of the object in a previous frame with respect to the current frame, a determination means that determines whether the object is present in a first distance region or in a second distance region farther than the first distance region on the basis of the distance of the object in the previous frame, a first matching processing means that detects the object by performing template matching using a first template with respect to the object in the previous frame in the predictive region of the current frame in a case in which the determination means determines that the object is present in the first distance region, and a second matching processing means that detects the object by performing template matching using a second template different from the first template with respect to the object in the previous frame in the predictive region of the current frame in a case in which the determination means determines that the object is present in the second distance region."

CITATION LIST

Patent Literature

PTL 1: Japanese Patent No. 6614247

SUMMARY OF INVENTION

Technical Problem

In PTL 1, a detection frame position is estimated with high accuracy using only a frame before a target frame. Therefore, improvement of detection frame position accuracy of the target frame is limited to a case in which detection frame position accuracy in the previous frame is high, and improvement of detection frame position accuracy through detection frame position correction using parts before and after the target frame is not assumed.

Therefore, in view of the above circumstances, an object of the present invention is to provide a detection frame position accuracy improvement system and a detection frame position correction method capable of estimating a detection frame position with high accuracy using information before and after a target frame.

Solution to Problem

In order to solve the above problem, one of representative detection frame position accuracy improvement systems of the present invention includes: a time-series image input unit that inputs time-series images; an object detection unit that detects a target object with the time-series images; a detection frame position distribution estimation unit that estimates a distribution of detection frame position coordinates at a correction target time from detection results of the target object up to a time before the correction target time; a detection frame prediction unit that predicts a position of a detection frame at a time after the correction target time according to the detection results and the distribution; a detection frame uncertainty estimation unit that updates the distribution of the detection frame position coordinates at the correction target time according to degrees of overlap between the detection results of the target object at the time after the correction target time and the predicted detection frame and estimates uncertainty of a detection frame at the correction target time; and a detection frame correction unit that corrects the detection frame at the correction target time on the basis of the detection frame and the uncertainty.

Advantageous Effects of Invention

According to the present invention, the accuracy of a detection frame position can be improved.

Problems, configurations, and effects other than those described above will be clarified by the following description of embodiments.

DESCRIPTION OF EMBODIMENTS

Hereinafter, embodiments of the present invention will be described with reference to the drawings.

Embodiment 1

Figure 1:
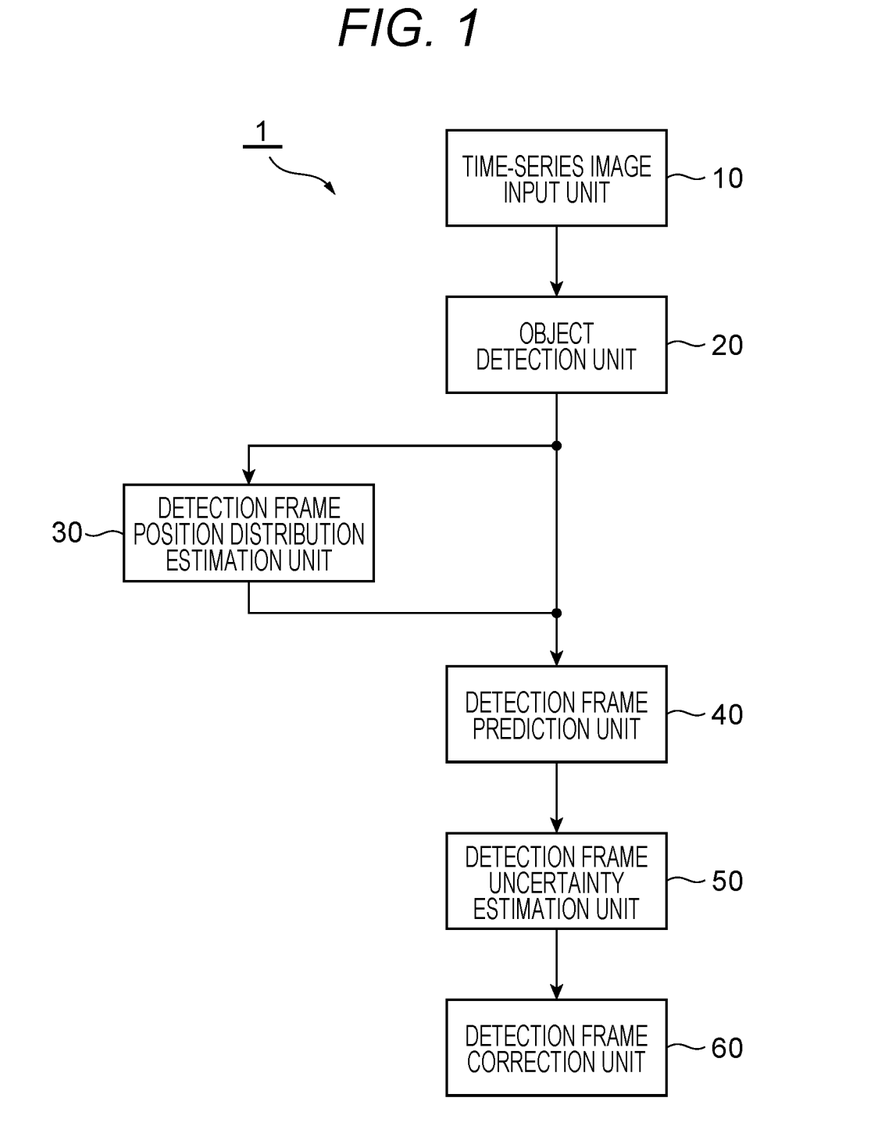
FIG. 1 is a block diagram of embodiment 1 of the present invention.

FIG. 1 is a block diagram of embodiment 1 of the present invention. In the present embodiment, a case in which the present invention is applied to sensor information obtained from a vehicle will be described. A detection frame position accuracy improvement system 1 illustrated in FIG. 1 is a system that performs offline correction of a detection frame position of a target object on an image using time-series images and a distance measuring sensor.

In the following description, a correction target time at which correction is performed (specifically, it is determined whether or not it is necessary to perform correction, and correction is performed in a case in which it is determined to be necessary) is referred to as time t (t is a positive integer), a (past) time before the correction target time is referred to as time t−n (n is a positive integer), and a (future) time after the correction target time is referred to as time t+n (n is a positive integer).

Although a vehicle such as a preceding vehicle is set as a detection/correction target in the following description, for example, it is needless to say that the detection/correction target is not limited to only the vehicle.

The detection frame position accuracy improvement system 1 illustrated in FIG. 1 includes a time-series image input unit 10 that inputs time-series images captured and saved by a drive recorder or the like mounted on a vehicle separately from the system, an object detection unit 20 that detects an object (target object) such as a vehicle, a two-wheeled vehicle, or a pedestrian in the images input to the time-series image input unit 10, a detection frame position distribution estimation unit 30 that estimates a distribution of detection frame position coordinates of an image at a certain time t at which correction is performed, a detection frame prediction unit 40 that predicts detection frame positions at times t+1 to t+n on the basis of outputs of the object detection unit 20 and the detection frame position distribution estimation unit 30, a detection frame uncertainty estimation unit 50 that estimates uncertainty of an image position (=detection frame) at time t on the basis of a degree of overlap between a predicted detection frame and a detection frame detected in each image by a detector, and a detection frame correction unit 60 that corrects the detection frame using the uncertainty. Hereinafter, details of each function of 10, 20, 30, 40, 50, and 60 will be described.

The time-series image input unit 10 arranges images obtained by an imaging device such as a monocular camera or a stereo camera in time-series order and inputs the images.

Figure 2:
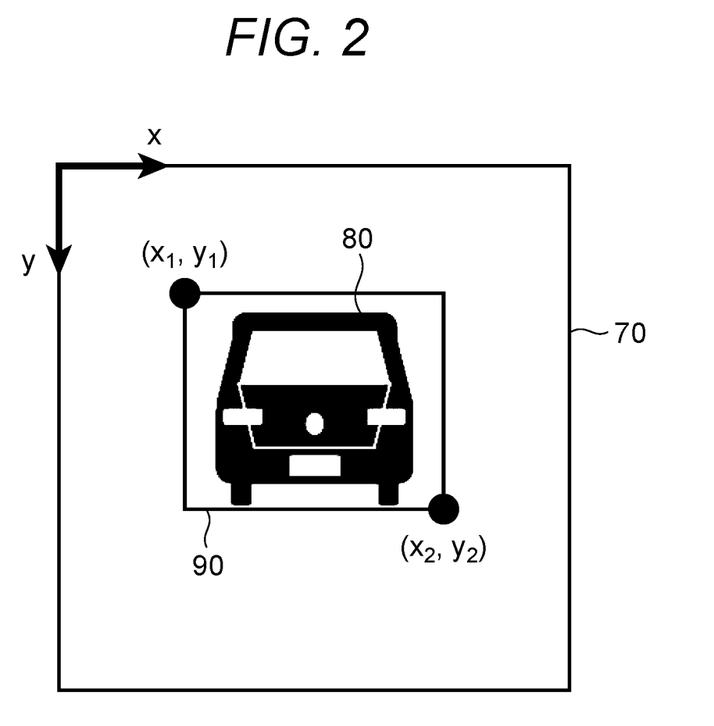
FIG. 2 is a diagram illustrating an object detection unit 20.

The object detection unit 20 will be described using FIG. 2. In the object detection unit 20, a region including a target object (also referred to as a detection frame) is estimated by a person or a detector in each time-series image. 70 denotes a certain image of time-series images, 80 denotes a target object to be detected, and the target object is an automobile in FIG. 2. 90 denotes a detection frame in a case in which the target object has been detected, and the position of the detection frame is determined by designating (x1, y1) at the upper left of the detection frame and (x2, y2) at the lower right of the detection frame. Although the detection frame is illustrated in two dimensions of a length and a width here, a three-dimensional detection frame having a length, a width, and a height may be a target.

Figure 3:
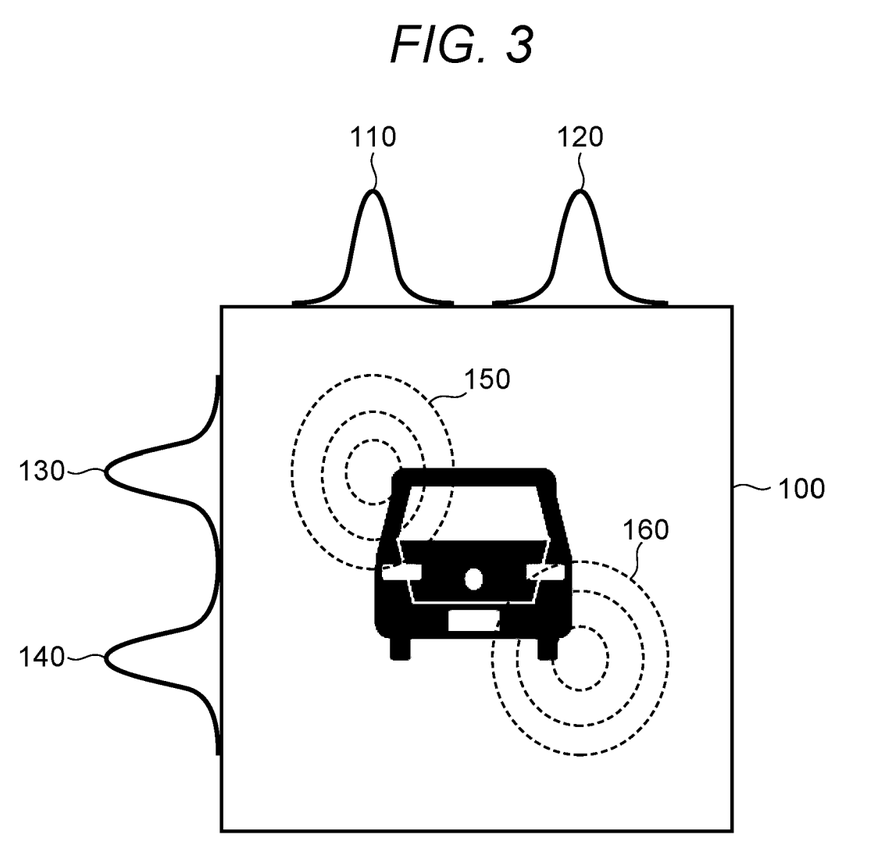
FIG. 3 is a diagram illustrating a detection frame position distribution estimation unit 30.

The detection frame position distribution estimation unit 30 will be described using FIG. 3. The detection frame position distribution estimation unit 30 estimates a probability distribution of detection frame position coordinates of an image at time t at which correction is performed using detection frame positions up to time t−1. 100 denotes a certain image of time-series images, 110 denotes a probability distribution of coordinates on an image in which x1 constituting the detection frame is present, 120 denotes a probability distribution of coordinates on an image in which x2 is present, 130 denotes a probability distribution of coordinates on an image in which y1 constituting the detection frame is present, and 140 denotes a probability distribution of coordinates on an image in which y2 is present. Although normal distributions are illustrated as the probability distributions of 110, 120, 130, and 140 here, the distribution of coordinates is not limited to the normal distribution. 150 denotes contour lines of normal distributions of two variables x1 and y1 at the upper left coordinate (x1, y1) of the detection frame that is the target object. 160 denotes contour lines of normal distributions of two variables x2 and y2 at the lower right coordinate (x2, y2) of the detection frame that is the target object. A portion having a high contour line of 150 or 160 is a location having a high probability as detection frame position coordinates. A statistical method such as a Kalman filter can be applied to prediction of the probability distribution.

Figure 4:
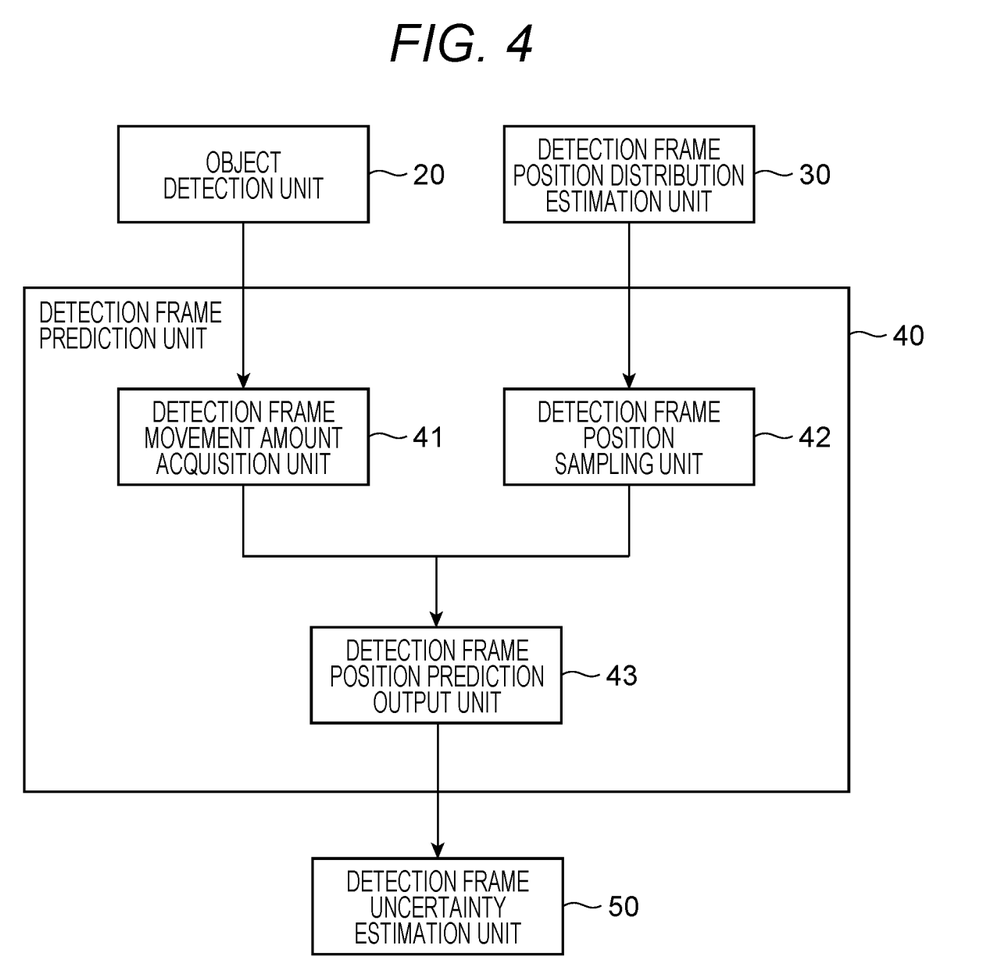
FIG. 4 is a configuration diagram of a detection frame prediction unit 40.

The detection frame prediction unit 40 will be described using FIG. 4. The detection frame prediction unit 40 includes a detection frame movement amount acquisition unit 41 that estimates a movement amount of a detection frame from a relative speed or the like of a target object at times t to t+n, a detection frame position sampling unit 42 that samples upper left coordinates and lower right coordinates (detection frame position coordinates) of the detection frame at time t on the basis of probability distributions estimated by the detection frame position distribution estimation unit 30, and a detection frame position prediction output unit 43 that determines detection frame positions at times t+1 to t+n from the detection frame movement amount acquisition unit 41 and the detection frame position sampling unit 42. 41, 42, and 43 will be described in detail.

The detection frame movement amount acquisition unit 41 predicts the direction of the target object, a relative speed between a host vehicle and the target object, and the like for determining changes in the size and the position (movement destination) of the detection frame at times t+1 to t+n by a Kalman filter or the like from detection information at times 1 to t−1, and determines a movement amount of the detection frame. In addition, if it is possible to use a distance measuring sensor such as a LIDAR or millimeter waves at times t+1 to t+n, the relative speed or the direction may be obtained by measuring the distance to the target object or obtaining an object region range using such a sensor. Furthermore, a method of limiting an upper limit of the movement amount by comparing the movement amount with a physical law is also conceivable.

The detection frame position sampling unit 42 outputs upper left coordinates and lower right coordinates (detection frame position coordinates) of the detection frame at time t at which the probability is high on the basis of the probability distributions estimated by detection frame position distribution estimation unit 30. Furthermore, coordinates having a low probability at a certain probability ε are also randomly output such that the detection frame position coordinates can be globally output.

The detection frame position prediction output unit 43 obtains position coordinates (also referred to as predictive detection frame) of the detection frame at times t+1 to t+n with the movement amount acquired by the detection frame movement amount acquisition unit 41 as a constraint condition by using the detection frame (detection frame based on the probability distributions) at time t determined by the detection frame position sampling unit 42 as an initial value.

Figure 5:
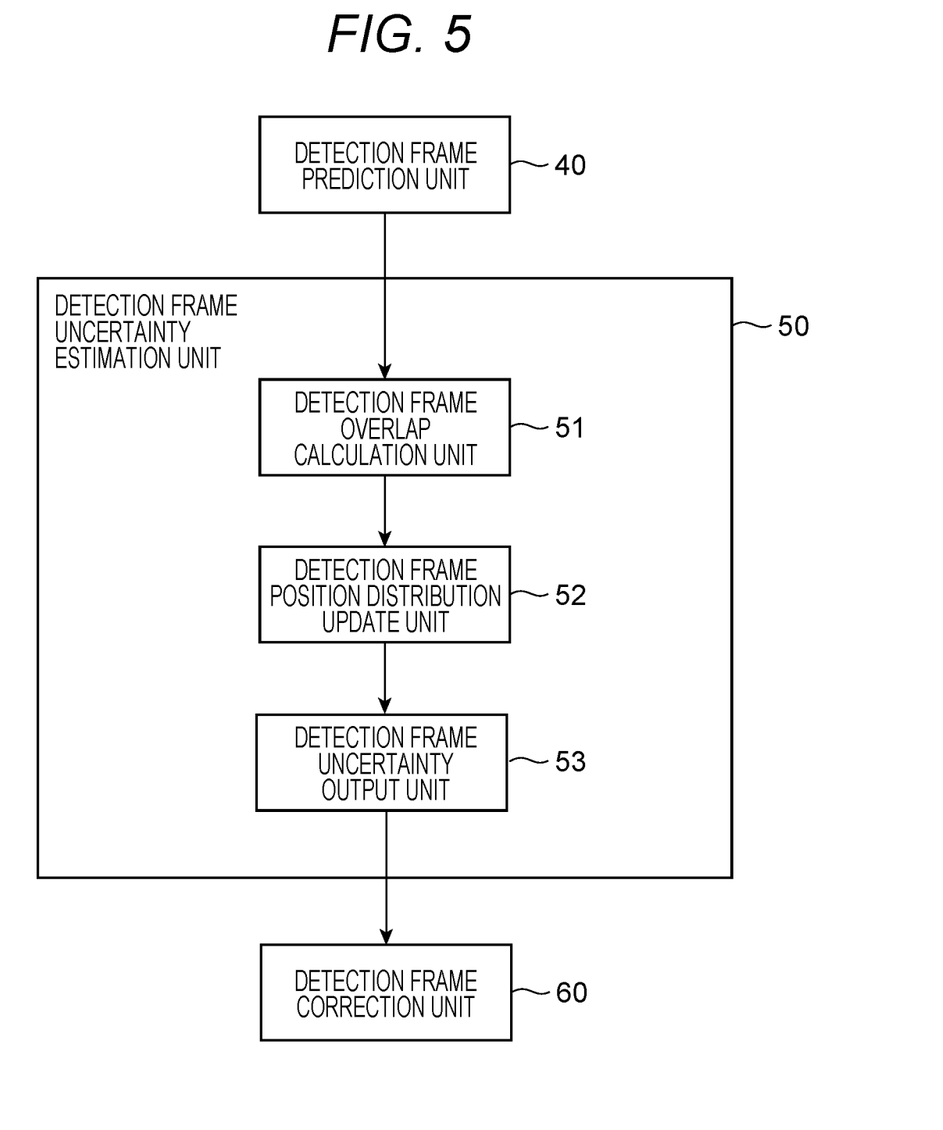
FIG. 5 is a configuration diagram of a detection frame uncertainty estimation unit 50.

The detection frame uncertainty estimation unit 50 will be described using FIG. 5. The detection frame uncertainty estimation unit 50 includes a detection frame overlap calculation unit 51 that calculates a degree of overlap between the detection frame (predictive detection frame) predicted by the detection frame prediction unit 40 and the detection frame estimated by the object detection unit 20, a detection frame position distribution update unit 52 that updates the probability distributions estimated by the detection frame position distribution estimation unit 30 on the basis of the degree of overlap, and a detection frame uncertainty output unit 53 that calculates, from the estimated probability distributions, a region where the detection frame is likely to be present at time t (detection frame to which uncertainty has been added). 51, 52, and 53 will be described in detail.

The detection frame overlap calculation unit 51 evaluates how much the detection frame (predictive detection frame) predicted by the detection frame prediction unit 40 and the detection frame estimated by the object detection unit 20 match with each other by the degree of overlap between the detection frames. Intersection over Union (IoU) or the like can be conceived as an evaluation index of the degree of overlap.

In the detection frame position distribution update unit 52, a method of updating the average and variance of multivariate normal distributions of detection frame position coordinates using Bayesian updating, or obtaining an average and variance that maximize a reward having a degree of overlap as the reward using reinforcement learning, and the like by using the value (degree of overlap) of the detection frame overlap calculation unit 51 are conceivable.

The detection frame uncertainty output unit 53 outputs a region in which the detection frame is likely to be present at time t (detection frame to which uncertainty has been added) using the standard deviation or the like of the probability distributions of the detection frame position coordinates estimated by the detection frame position distribution update unit 52 of the detection frame uncertainty estimation unit 50. Details will be described later using FIG. 7.

Figure 6:
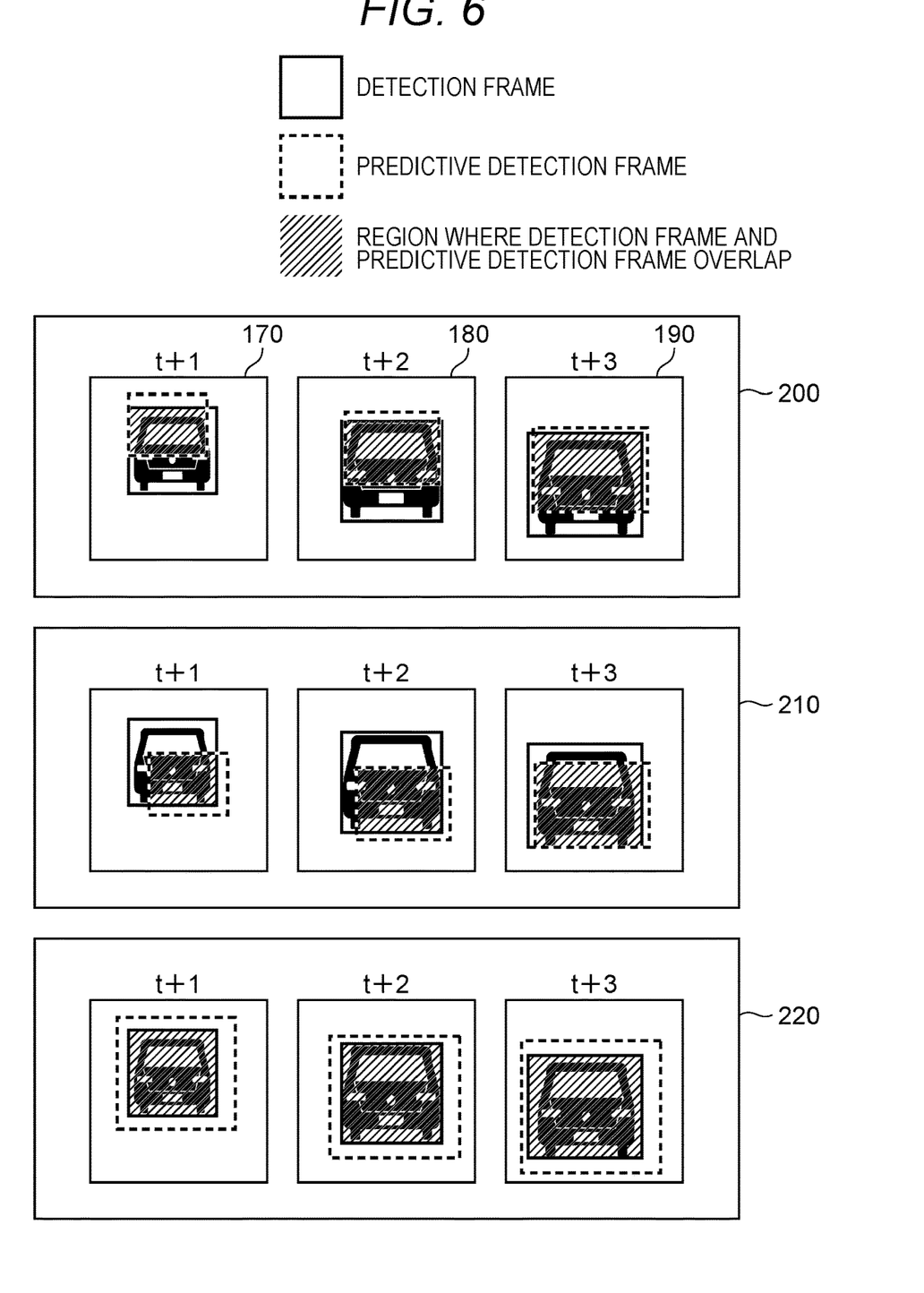
FIG. 6 is a diagram illustrating the detection frame prediction unit 40 and the detection frame uncertainty estimation unit 50.

The detection frame prediction unit 40 to the detection frame overlap calculation unit 51 of the detection frame uncertainty estimation unit 50 will be described using FIG. 6. Time-series images 200 are images at certain times t+1, t+2, and t+3, and are images in a case in which a detection frame in the upper portion of a target object is sampled at time t. 170 includes a predictive detection frame at time t+1, a detection frame estimated by a detector or the like (that is, a detection frame estimated by the object detection unit 20), and a region where the predictive detection frame and the detection frame overlap. 180 includes a predictive detection frame at time t+2, a detection frame estimated by a detector or the like, and a region where the predictive detection frame and the detection frame overlap. 190 includes a predictive detection frame at time t+3, a detection frame estimated by a detector or the like, and a region where the predictive detection frame and the detection frame overlap. In the time-series images 200, since the detection frame sampled at time t is in the upper portion with respect to the target object, the predictive detection frame for a relatively short time such as times t to t+3 is present in the upper portion with respect to the target object even if a predicted movement amount (detection frame movement amount acquisition unit 41) is added. Time-series images 210 are images at certain times t+1, t+2, and t+3, and are images in a case in which a detection frame in the lower portion of the target object is sampled at time t. In the time-series images 210, since the detection frame sampled at time t is in the lower portion with respect to the target object, the predictive detection frame for a relatively short time such as times t to t+3 is present in the lower portion with respect to the target object even if the predicted movement amount (detection frame movement amount acquisition unit 41) is added. Time-series images 220 are images at certain times t+1, t+2, and t+3, and are images in a case in which a large detection frame is sampled with respect to the target object at time t. In the time-series images 220, since the detection frame is predicted to be large with respect to the target object at time t, the predictive detection frame for a relatively short time such as times t to t+3 becomes large with respect to the target object even if the predicted movement amount (detection frame movement amount acquisition unit 41) is added. In addition, since the coordinate values at time t are different in 200, 210, and 220, the detection frame position coordinates at times t+1 to t+3 are different, but since the size of the detection frame (for example, an enlargement ratio between times t+1, t+2, and t+3) is determined by (the movement amount of) the detection frame movement amount acquisition unit 41, the coordinate values are all equal in 200, 210, and 220.

Figure 7:
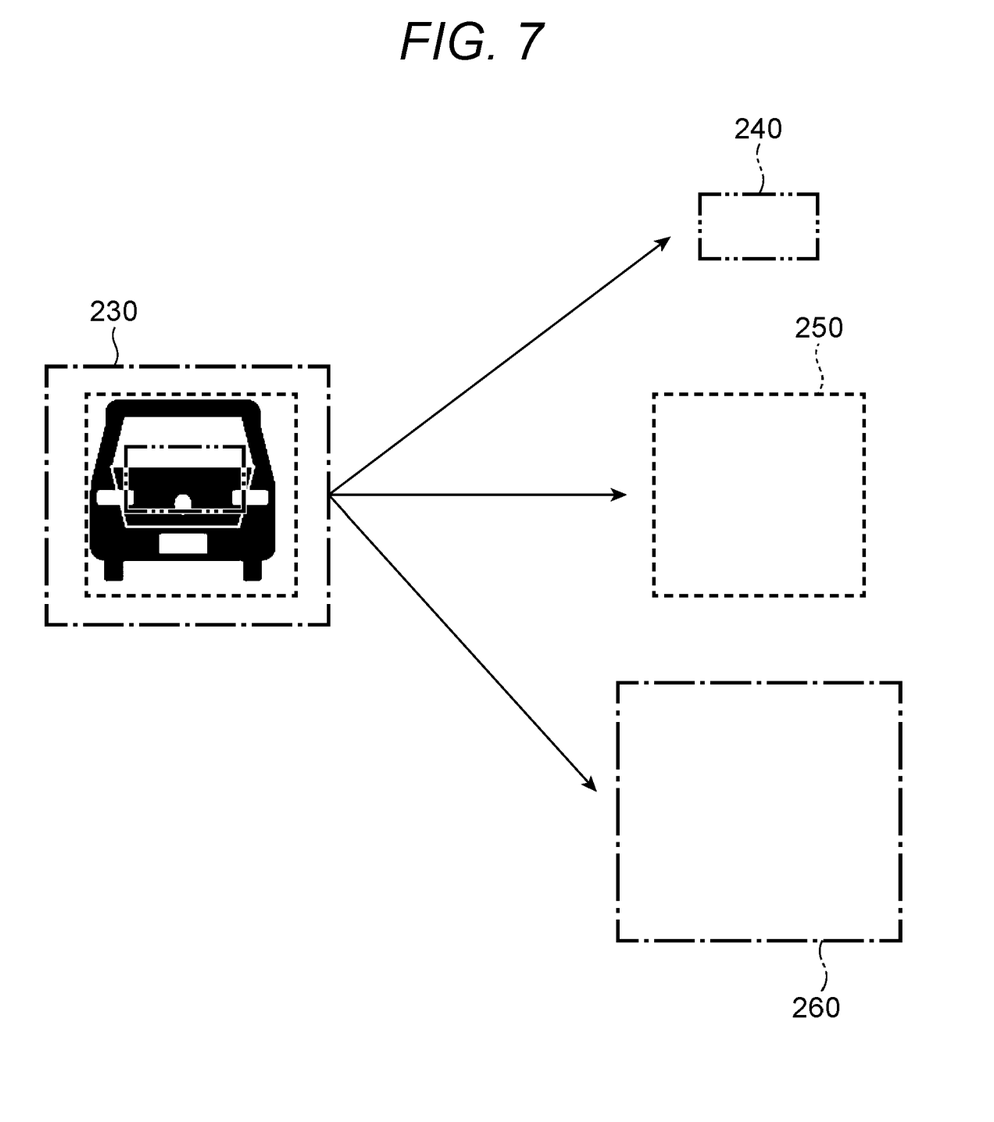
FIG. 7 is a diagram illustrating the detection frame uncertainty estimation unit 50.

The detection frame uncertainty estimation unit 50 will be described using FIG. 7. In the present embodiment, a detection frame 230 visualizing uncertainty includes, on the basis of the probability distributions obtained by the detection frame position distribution update unit 52, three detection frames, that is, a detection frame 240 having a minimum allowable size (standard deviation in a case in which the probability distributions are multivariate normal distributions) as a detection frame of a preset target object, a detection frame 250 based on coordinates having the highest probability (average in a case in which probability distributions are multivariate normal distributions), and a detection frame 260 having a maximum allowable size (standard deviation in a case in which the probability distributions are multivariate normal distributions) as a detection frame of one preset target object. The sizes of the detection frames 240, 250, and 260 can be determined by probability distributions of position coordinates (in other words, the range in which detection frames are present at time t can be limited from updated probability distributions of the detection frame position coordinates), and a large standard deviation is taken in a case in which it is assumed that the sizes vary greatly. For example, when taking 3 times the standard deviation, it is predicted that the detection frame is included within the range set from 240 to 260 with a probability of 99%.

Figure 8:
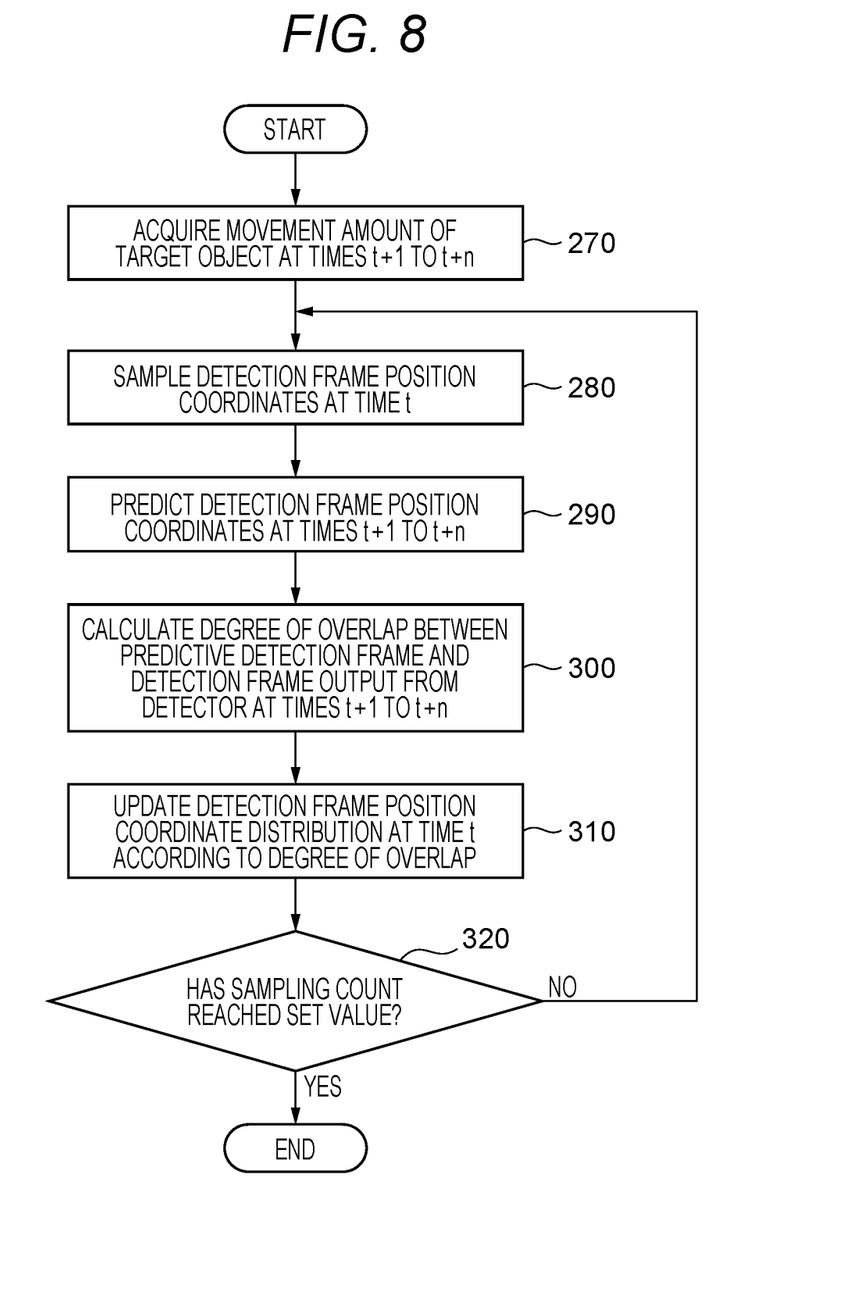
FIG. 8 is a flowchart of the detection frame prediction unit 40 and the detection frame uncertainty estimation unit 50.

The detection frame prediction unit 40 and the detection frame uncertainty estimation unit 50 will be described using the flowchart of FIG. 8. First, in step 270, a movement amount of (a detection frame of) a target object at times t+1 to t+n is estimated from the outputs of the object detection unit 20 and the detection frame position distribution estimation unit 30 using a Kalman filter or the like (detection frame movement amount acquisition unit 41). Alternatively, a movement amount such as a relative speed is estimated by using a distance measuring sensor. Here, a prediction range becomes excessively long and the prediction accuracy is lowered if a large value is set to n, whereas the number of undetected images (detection frame undetected images) increases, and there is a high possibility that a large deviation of one detection frame position becomes an outlier and the correction accuracy is lowered in a case in which the detection frame is automatically output by a detector if n is excessively small, and thus it is necessary to determine the value of n in consideration of a frame rate of an obtained image.

In step 280, detection frame position coordinates at time t are output according to a probability distribution estimated by the detection frame position distribution estimation unit 30 (detection frame position sampling unit 42). At this time, if only coordinates having a high probability are output, the accuracy of a sampled position decreases in a case in which the estimation accuracy of the detection frame position distribution estimation unit 30 is low, and thus coordinates having a low probability of probability ε are also randomly output, and the detection frame position coordinates can be globally output.

In step 290, detection frame positions (detection frame position coordinates) at times t+1 to t+n are predicted using the results of steps 270 and 280 (detection frame position prediction output unit 43).

In step 300, degrees of overlap between the detection frames of prediction at times t+1 to t+n and a detection frame output from the detector at each time are calculated (detection frame overlap calculation unit 51). A degree of overlap is calculated by using intersection over Union (IoU) or the like.

In step 310, a detection frame position coordinate distribution (probability distribution) at time t is updated according to the degrees of overlap (detection frame position distribution updating unit 52). That is, the detection frame position coordinate distribution is updated such that a probability increases with respect to detection frame position coordinates at time t at which a degree of overlap increases and updated such that a probability decreases with respect to detection frame position coordinates at time t at which a degree of overlap decreases.

In step 320, it is determined whether the number of times of sampling has reached a set value set in advance by a user. Processing ends in a case in which the number of times of sampling has been reached, and processing returns to step 280 and the detection frame position coordinates at time t are sampled again in a case in which the number of times of sampling has not been reached. Since the detection frame position coordinate distribution at time t is updated in step 310, many coordinates having higher degrees of overlap with the detection frames output from the detector or the like at times t+1 to t+n are sampled by performing repetitive sampling.

Figure 9:
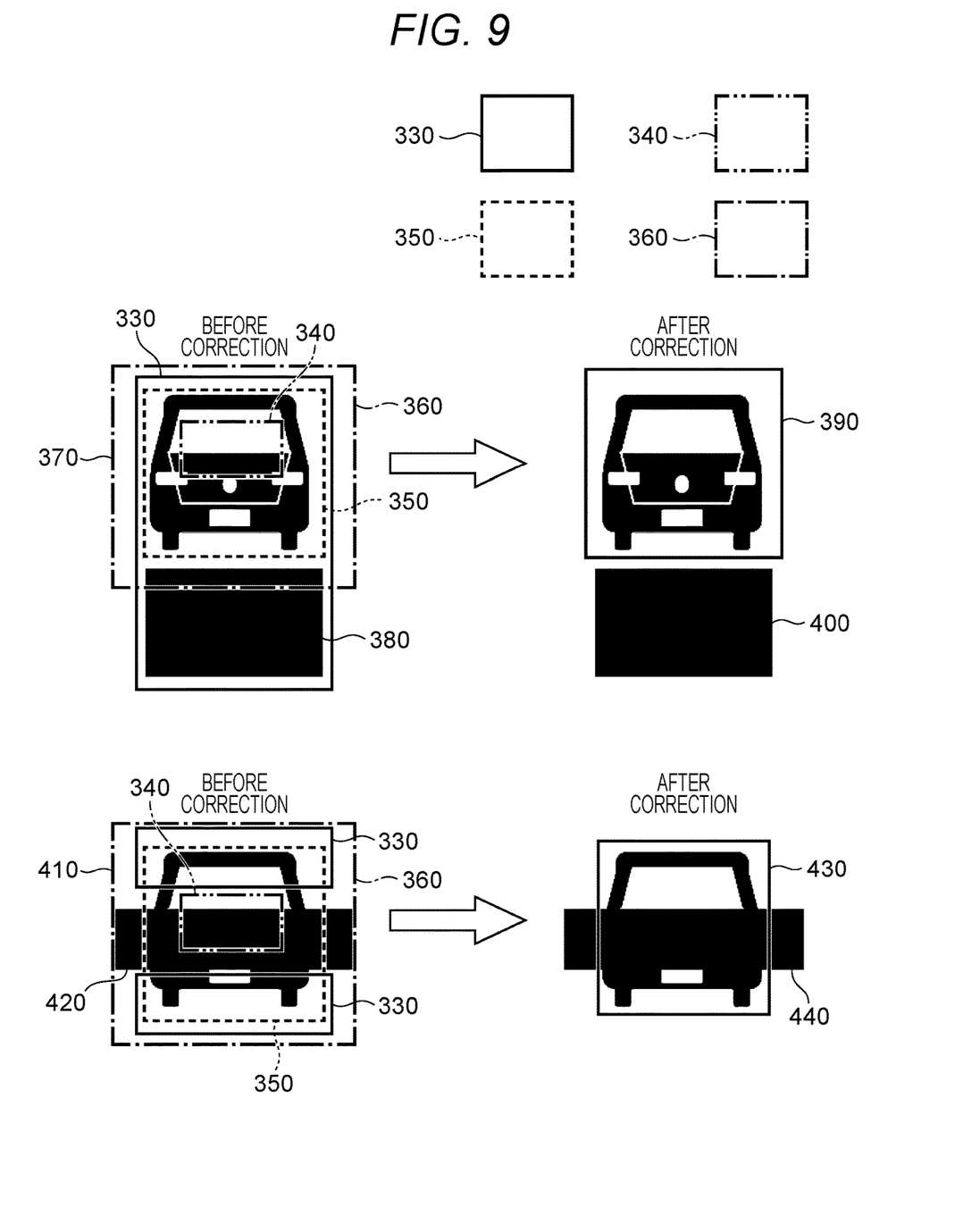
FIG. 9 is a diagram illustrating a detection frame correction unit 60.

The detection frame correction unit 60 will be described using FIGS. 9. 330, 340, 350, and 360 denote types of detection frames used in this figure. The solid line 330 indicates a detection frame output by a person or a detector (in other words, estimated by the object detection unit 20) in each image. Meanwhile, on the basis of a probability distribution obtained by the detection frame position distribution update unit 52, the two-dot chain line 340 indicates a detection frame having an assumed minimum size (allowable as a detection frame of a target object set in advance), the broken line 350 indicates a detection frame having the highest probability, and the one-dot chain line 360 indicates a detection frame having an assumed maximum size (allowable as a detection frame of the target object set in advance) (detection frame uncertainty output unit 53).

370 denotes a certain image obtained by visualizing the uncertainty detection frames corresponding to the detection frames 330, 340, 350, and 360, and the detection frame 330 output by the detector includes a noise 380. The noise 380 corresponds to a shadow of a target object due to back light, or the like. Here, the detection frame 330 includes the noise 380 and is output larger than a detection frame in which only the target object is detected. At this time, the detection frame 330 becomes larger than the maximum (uncertainty) detection frame 360 and becomes a detection frame to be corrected. In the case of correction, a method of replacing the detection frame 330 with the detection frame 350 having the maximum detection frame probability, or the like is considered. An image 390 is a result of correcting the detection frame 330 in the image 370 (detection frame correction unit 60). After correction, the detection frame becomes a detection frame that does not include a noise 400 and detects only the target object. Although a case in which the detection frame 330 is larger than the assumed maximum detection frame 360 has been described in the image 370, modification (correction) can be similarly performed even in a case in which the detection frame 330 is smaller than the assumed minimum detection frame 340.

410 denotes a certain image obtained by visualizing the uncertainty detection frames corresponding to the detection frames 330, 340, 350, and 360, and the detection frame 330 output by the detector is divided by a noise 420. The noise 420 corresponds to a case in which a part of a preceding vehicle is hidden by a wiper, a two-wheeled vehicle, or the like. In the image 410, the two detection frames 330 are inside the allowable maximum detection frame 360 and outside the allowable minimum detection frame 340, and thus are determined to be detection frames for the same target object and become detection frames to be corrected. In the case of correction, a method of integrating the two detection frames 330, a method of replacing the detection frames with the detection frame 350 having the maximum detection frame probability, or the like can be considered. An image 430 is a result of correcting the detection frames 330 in the image 410 (detection frame correction unit 60). After correction, the detection frame in which the target object is detected is not affected by the noise of 440.

However, the detection frame correction method using detection frame uncertainty by the detection frame correction unit 60 is not limited to the method described here.

In embodiment 1 of the present invention, with the functional configuration described above, it is possible to correct variation in a detection frame due to noise with high accuracy by estimating the uncertainty of the detection frame position using information before and after an image to be corrected.

As described above, the detection frame position accuracy improvement system 1 according to embodiment 1 of the present invention includes the time-series image input unit 10 that inputs time-series images, the object detection unit 20 that detects a target object with the time-series images, the detection frame position distribution estimation unit 30 that estimates a distribution of detection frame position coordinates at a correction target time (time t) from detection results of the target object up to a time (time t−1) before the correction target time, the detection frame prediction unit 40 that predicts positions of a detection frame at times (times t+1 to t+n) after the correction target time according to the detection results and the distribution, the detection frame uncertainty estimation unit 50 that updates the distribution of the detection frame position coordinates at the correction target time (time t) according to degrees of overlap between the detection results of the target object at the times (times t+1 to t+n) after the correction target time and the predicted detection frame and estimates uncertainty of a detection frame at the correction target time (time t), and the detection frame correction unit 60 that corrects the detection frame at the correction target time (time t) on the basis of the detection frame and the uncertainty.

Further, the detection frame prediction unit 40 includes the detection frame position sampling unit 42 that samples position coordinates of a detection frame at the correction target time (time t) from the distribution estimated from the detection results, and the detection frame movement amount acquisition unit 41 that acquires a movement amount including at least one of a relative speed, a direction, or the like of the target object at times (times t+1 to t+n) after the correction target time at which a movement destination of the detection frame is determined, a detection frame position at the correction target time (time t) is determined by the detection frame position sampling unit 42, and positions of the detection frame at the times (times t+1 to t+n) after the correction target time are predicted by the movement amount acquired by the detection frame movement amount acquisition unit 41.

In addition, the detection frame uncertainty estimation unit 50 limits the range in which detection frames are present at the correction target time (time t) from the updated distribution of the detection frame position coordinates.

Further, the detection frame position correction method of embodiment 1 of the present invention includes inputting time-series images, detecting a target object with the time-series images, estimating a distribution of detection frame position coordinates at a correction target time (time t) from detection results of the target object up to a time (time t−1) before the correction target time, predicting positions of a detection frame at times (times t+1 to t+n) after the correction target time according to the detection results and the distribution, updating the distribution of the detection frame position coordinates at the correction target time (time t) according to degrees of overlap between the detection results of the target object at the times (times t+1 to t+n) after the correction target time and the predicted detection frame, estimating uncertainty of a detection frame at the correction target time (time t), and correcting the detection frame at the correction target time (time t) on the basis of the detection frame and the uncertainty.

That is, in the present embodiment 1, a region (uncertainty) in which a current detection frame is present is estimated using time-series images before and after a target frame of detection frame position correction and data of a distance measuring sensor or the like, and detection result output by the detector or the like are corrected.

According to the present embodiment 1, the accuracy of a detection frame position can be improved.

Embodiment 2

Figure 10:
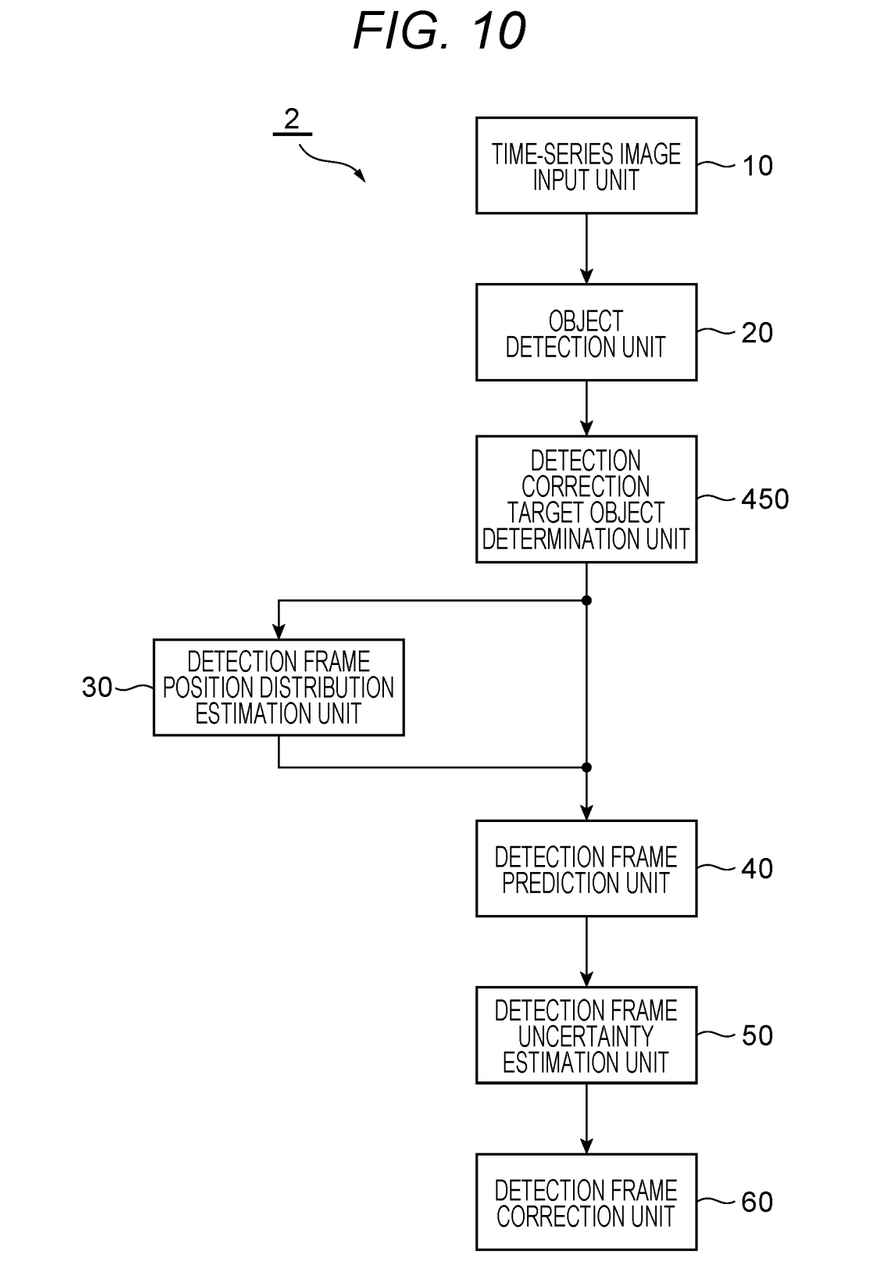
FIG. 10 is a block diagram of embodiment 2 of the present invention.

FIG. 10 is a block diagram of embodiment 2 of the present invention. The present embodiment is directed to a case in which the same image includes a plurality of target objects and there is a plurality of detection frames.

A detection frame position accuracy improvement system 2 illustrated in FIG. 10 includes a time-series image input unit 10 that inputs time-series images captured and saved by a drive recorder or the like mounted on a vehicle separately from the system, an object detection unit 20 that detects an object (target object) such as a vehicle, a two-wheeled vehicle, a pedestrian, or the like in the images input by the time-series image input unit 10, a detection correction target object determination unit 450 that determines a detection frame to be corrected in the time-series images, a detection frame position distribution estimation unit 30 that estimates a distribution of detection frame position coordinates of an image at a certain time t at which correction is performed, a detection frame prediction unit 40 that predicts detection frame positions at times t+1 to t+n on the basis of outputs of the object detection unit 20 and the detection frame position distribution estimation unit 30, a detection frame uncertainty estimation unit 50 that estimates uncertainty of an image position (=detection frame) at time t on the basis of a degree of overlap between a predicted detection frame and a detection frame detected from an image by a detector, and a detection frame correction unit 60 that corrects the detection frame using the uncertainty. 10, 20, 30, 40, 50, and 60 have functions equivalent to those described in embodiment 1.

Figure 11:
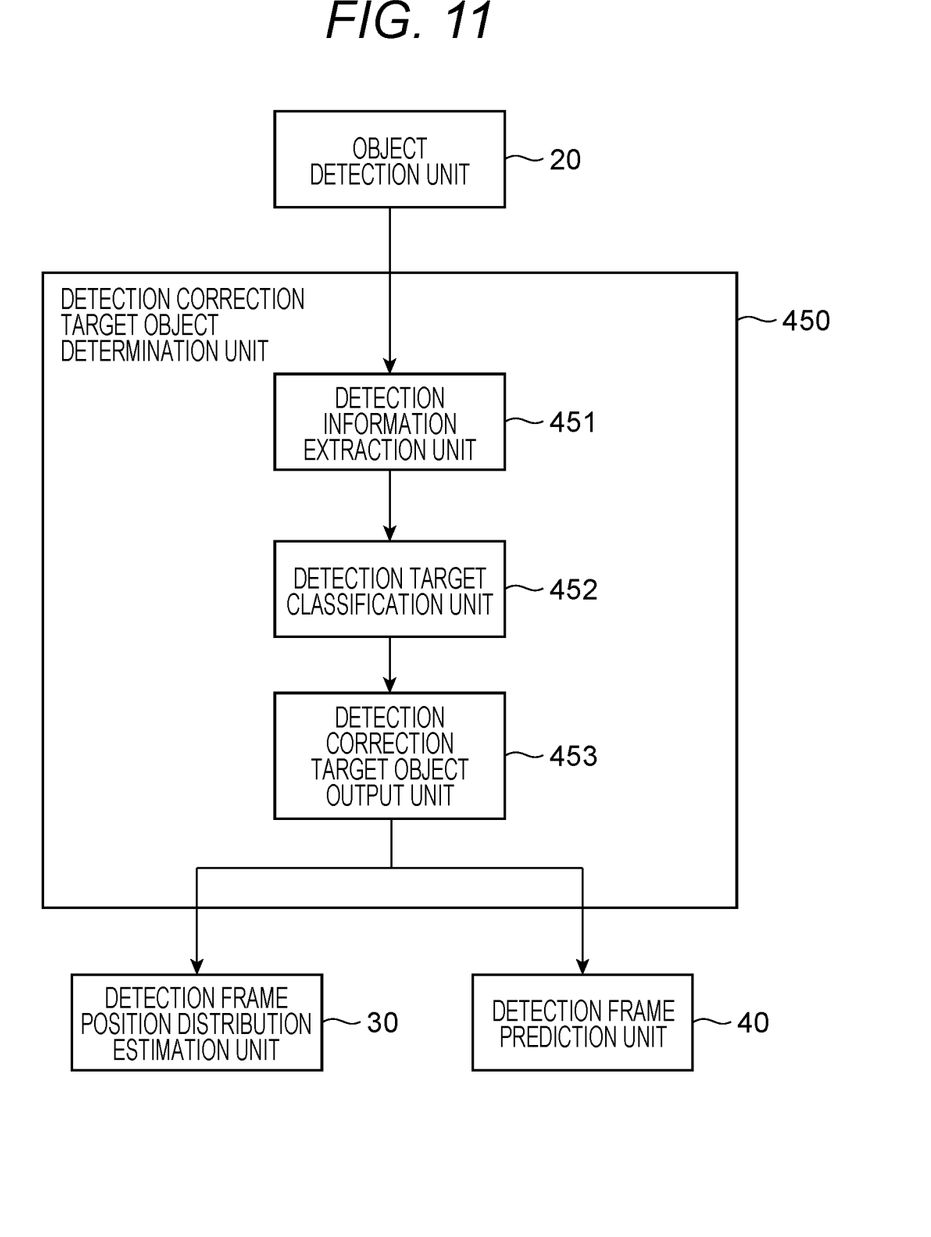
FIG. 11 is a configuration diagram of a detection correction target object determination unit 450.

The detection correction target object determination unit 450 will be described using FIG. 11. The detection correction target object determination unit 450 includes a detection information extraction unit 451 that extracts a feature amount and the like of a target object (detection frame) used to determine whether or not target objects are the same target object, a detection target classification unit 452 that classifies target objects with the entire time-series images on the basis of information of the detection information extraction unit 451, and a detection correction target object output unit 453 that outputs a detection frame of an object to be detected and corrected (detection correction target object).

As a feature amount extracted by the detection information extraction unit 451, for each detection frame, a label of a detected target object such as an automobile, a person, or a two-wheeled vehicle, a feature amount descriptor universal for scale, rotation, and the like including scale invariant feature transform (SIFT), a feature amount descriptor output by applying a trained convolutional neural network or the like a plurality of times, and the like are considered.

The detection target classification unit 452 determines and classifies a detection frame for each same target object in time-series images by using a Euclidean distance and cosine similarity for a feature amount obtained by the detection information extraction unit 451 for each image and each detection frame.

The detection correction target object output unit 453 outputs a detection frame to be corrected. In addition, in a case in which a detector automatically outputs a detection frame, if the number of detections is small due to a large number of detection omissions, correction is difficult, or there is a high possibility of degradation in correction accuracy, the user is notified of this.

In embodiment 2 of the present invention, with the functional configuration described above, it is possible to narrow down the number of correction targets to one in advance even in a case in which an image includes a plurality of objects, and it is possible to correct variation in a detection frame due to noise with high accuracy by estimating the uncertainty of a detection frame position using information before and after an image to be corrected.

As described above, the detection frame position accuracy improvement system 2 of embodiment 2 of the present invention includes the detection correction target object determination unit 450 that determines the same target object in the time-series images, in addition to the above-described embodiment 1.

Further, the detection correction target object determination unit 450 includes the detection correction target object output unit 453 that extracts a feature amount of each detection frame (detection information extraction unit 451), determines the same target object in the time-series images from the feature amount (detection target classification unit 452), and sets the same target object as a detection frame correction target object.

According to the present embodiment 2, even in a case in which the same image includes a plurality of target objects, the accuracy of a detection frame position can be improved.

Note that the present invention is not limited to the above-described embodiments, and includes various modifications. For example, the above-described embodiments have been described in detail for easy understanding of the present invention, and are not necessarily limited to those having all the described configurations. In addition, a part of the configuration of a certain embodiment can be replaced with the configuration of another embodiment, and the configuration of another embodiment can be added to the configuration of a certain embodiment. In addition, it is possible to add, delete, and replace other configurations for a part of the configuration of each embodiment. In addition, some or all of the above-described configurations, functions, processing units, processing means, and the like may be realized by hardware, for example, by designing with an integrated circuit. In addition, each of the above-described configurations, functions, and the like may be realized by software by a processor interpreting and executing a program for realizing each function. Information such as a program, a table, and a file for realizing each function can be stored in a recording device such as a memory, a hard disk, and a solid state drive (SSD), or a recording medium such as an IC card, an SD card, and a DVD. In addition, the control lines and the information lines indicate what is considered to be necessary for the description, and do not necessarily indicate all the control lines and the information lines on the product. In practice, it may be considered that almost all the configurations are connected to each other.

REFERENCE SIGNS LIST

1 Detection frame position accuracy improvement system (embodiment 1)
2 Detection frame position accuracy improvement system (embodiment 2)
10 Time-series image input unit
20 Object detection unit
30 Detection frame position distribution estimation unit
40 Detection frame prediction unit
50 Detection frame uncertainty estimation unit
60 Detection frame correction unit
450 Detection correction target object determination unit (embodiment 2)

The invention claimed is:

1. A detection frame position accuracy improvement system comprising:
a time-series image input unit that inputs time-series images;
an object detection unit that detects a target object with the time-series images;
a detection frame position distribution estimation unit that estimates a distribution of detection frame position coordinates at a correction target time from detection results of the target object up to a time before the correction target time;
a detection frame prediction unit that predicts a position of a detection frame at a time after the correction target time according to the detection results and the distribution;
a detection frame uncertainty estimation unit that updates the distribution of the detection frame position coordinates at the correction target time according to degrees of overlap between the detection results of the target object at the time after the correction target time and the predicted detection frame and estimates uncertainty of a detection frame at the correction target time; and
a detection frame correction unit that corrects the detection frame at the correction target time based on the detection frame and the uncertainty.

2. The detection frame position accuracy improvement system according to claim 1, wherein the detection frame prediction unit includes a detection frame position sampling unit that samples position coordinates of the detection frame at the correction target time from the distribution estimated from the detection results.

3. The detection frame position accuracy improvement system according to claim 1, wherein the detection frame prediction unit includes a detection frame movement amount acquisition unit that acquires a movement amount including at least one of a relative speed or a direction of the target object at a time after the correction target time at which a movement destination of the detection frame is determined.

4. The detection frame position accuracy improvement system according to claim 1, wherein the detection frame prediction unit includes a detection frame position sampling unit that samples position coordinates of a detection frame at the correction target time from the distribution estimated from the detection results, and a detection frame movement amount acquisition unit that acquires a movement amount including at least one of a relative speed or a direction of the target object at a time after the correction target time at which a movement destination of the detection frame is determined, a detection frame position at the correction target time is determined by the detection frame position sampling unit, and a position of the detection frame at a time after the correction target time is predicted by the movement amount acquired by the detection frame movement amount acquisition unit.

5. The detection frame position accuracy improvement system according to claim 1, wherein the detection frame uncertainty estimation unit limits a range in which detection frames are present at the correction target time from the updated distribution of the detection frame position coordinates.

6. The detection frame position accuracy improvement system according to claim 5, wherein the detection frame uncertainty estimation unit includes, as detection frames for which the presence range is limited, a detection frame having a minimum size and a detection frame having a maximum size based on a standard deviation of the updated distribution of the detection frame position coordinates, and a detection frame based on coordinates having a highest probability of the updated distribution of the detection frame position coordinates.

7. The detection frame position accuracy improvement system according to claim 1, comprising a detection correction target object determination unit that determines a same target object in the time-series images.

8. The detection frame position accuracy improvement system according to claim 7, wherein the detection correction target object determination unit includes a detection correction target object output unit that extracts a feature amount of each detection frame, determines the same target object in the time-series images from the feature amount, and sets the same target object as a detection frame correction target object.

9. A detection frame position correction method comprising:
inputting time-series images;
detecting a target object with the time-series images;

estimating a distribution of detection frame position coordinates at a correction target time from detection results of the target object up to a time before the correction target time;

predicting a position of a detection frame at a time after the correction target time according to the detection results and the distribution;

updating the distribution of the detection frame position coordinates at the correction target time according to degrees of overlap between the detection results of the target object at the time after the correction target time and the predicted detection frame and estimating uncertainty of a detection frame at the correction target time; and correcting the detection frame at the correction target time based on the detection frame and the uncertainty.

10. The detection frame position correction method according to claim 9, comprising:

sampling position coordinates of a detection frame at the correction target time from the distribution estimated from the detection results;

acquiring a movement amount including at least one of a relative speed or a direction of the target object at a time after the correction target time at which a movement destination of the detection frame is determined;

determining a detection frame position at the correction target time according to the sampling; and predicting a position of the detection frame at the time after the correction target time by the acquired movement amount.

11. The detection frame position correction method according to claim 9, wherein the uncertainty of the detection frame at the correction target time is estimated by limiting a range in which detection frames are present at the correction target time from the updated distribution of the detection frame position coordinates.

* * * * *